United States Patent
Ootsuka et al.

(10) Patent No.: US 6,723,936 B2
(45) Date of Patent: Apr. 20, 2004

(54) ACTIVE ENERGY RAY-CURING ADHESIVE COMPOSITION AND KEYPAD FOR A PUSH-BUTTON SWITCH

(75) Inventors: Nobuyuki Ootsuka, Gunma (JP); Kunio Iriuchijima, Gunma (JP); Tetsuya Sakurai, Gunma (JP); Kengo Nishi, Tokyo (JP)

(73) Assignees: Denki Kagaku Kogyo Kabushiki Kaisha, Tokyo (JP); Polymatech Co., Ltd., Tokyo (JP)

( * ) Notice: Subject to any disclaimer, the term of this patent is extended or adjusted under 35 U.S.C. 154(b) by 10 days.

(21) Appl. No.: 10/404,048

(22) Filed: Apr. 2, 2003

(65) Prior Publication Data
US 2003/0196882 A1 Oct. 23, 2003

(30) Foreign Application Priority Data
Apr. 2, 2002 (JP) .......................... 2002-099653

(51) Int. Cl.$^7$ ................................. H01H 9/00
(52) U.S. Cl. ................ 200/517; 200/512; 200/341; 156/230; 156/273.5; 428/64.7
(58) Field of Search ................. 156/273.5, 230; 200/5 A, 512, 517, 314, 341, 345; 428/64.7, 66, 913, 916, 927, 904, 910, 56, 60, 345, 352; 522/90, 96, 97, 181, 182

(56) References Cited

U.S. PATENT DOCUMENTS

| | | | |
|---|---|---|---|
| 4,937,118 A | * | 6/1990 | Inagaki et al. ............ 428/64.7 |
| 5,819,406 A | * | 10/1998 | Yoshizawa et al. ........... 29/877 |
| 6,017,603 A | * | 1/2000 | Tokuda et al. ............ 428/64.1 |
| 6,488,803 B2 | * | 12/2002 | Kiuchi et al. ............ 156/230 |
| 6,621,027 B1 | * | 9/2003 | Shimizu et al. ............ 200/341 |

FOREIGN PATENT DOCUMENTS

| | | | |
|---|---|---|---|
| EP | 1244125 A1 | 9/2002 | .......... H01H/13/70 |
| JP | 08-127630 | 5/1996 | .......... C08F/90/06 |
| JP | 11-001507 | 1/1999 | .......... C08F/4/04 |
| JP | 3034834 | 5/1999 | .......... H01H/11/00 |
| JP | 11-144547 | 5/1999 | .......... H01H/11/00 |
| JP | 2000-243175 | 9/2000 | .......... H01H/11/00 |
| JP | 2001-031890 | 2/2001 | .......... C09D/4/00 |
| WO | WO 00/11097 | 3/2000 | .......... C09J/4/06 |
| WO | WO 02/49011 A1 | 6/2002 | .......... G11B/3/70 |

OTHER PUBLICATIONS

European Search Report dated Jun. 30, 2003.

* cited by examiner

Primary Examiner—Michael A. Friedhofer
(74) Attorney, Agent, or Firm—Rader, Fishman & Grauer PLLC

(57) ABSTRACT

An active energy ray-curing adhesive composition is provided that has high curing rate as well as excellent adhesion and bonding workability, and a keypad (11) for push-button switches that has not only high bonding rate of a hard resin keytop (20) to a base portion (12) but also has excellent adhesion and excellent bonding workability in the bonding step. The active energy ray-curing adhesive composition includes a urethane (meth) acrylate, a (meth)acrylamide compound, and a hydroxyl group-containing (meth)acrylate. Optionally, the composition may further contain particulate silicic anhydride, and at least one of a tertiary amine salt and a tertiary amine. In the keypad (11) for push-button switches, the hard resin keytop (20) is fixed to the base portion (12) made of a rubbery elastic material through an adhesive layer (19) made of the adhesive composition.

20 Claims, 4 Drawing Sheets

20f  20f

20f

ACTIVE ENERGY RAY-CURING ADHESIVE COMPOSITION AND KEYPAD FOR A PUSH-BUTTON SWITCH

BACKGROUND OF THE INVENTION

1. Field of the Invention

The present invention relates to an adhesive composition relating to adhesion of plastics and to a keypad for use in push-button switches with the adhesive composition.

2. Description of the Related Art

Heretofore, active energy ray-curing adhesives that cure upon irradiation of an active energy ray, such as an ultraviolet ray or an electron beam, have high curing rates and have been used in various fields by making the best of many advantages such as improvement of productivity, efficiency in the use of resources and energy, and safety of the working environment. However, the above-mentioned adhesives having such advantages can never be said to be perfect for any possible purpose, and some problems still remain to be improved on the following points.

One problem to be improved is poor adhesion to plastics. That is, plastics have a lower surface energy state than that of metals and depending on the kind of plastics, it is necessary to perform a preliminary treatment in the bonding step in order to improve adhesion. As such a preliminary treatment, for example, a short wavelength UV cleaning or corona discharge is performed on the surface of the plastics to activate the bonding area or a solvent-based anchoring agent as a primer is coated on the surface of the plastics. If the adhesion of adhesives to the plastics could be improved without such preliminary treatments, the bonding step would be further simplified.

Another problem to be improved is that the workability of the bonding adhesive is unsatisfactory. That is, the use of conventional adhesives may result in stringing of the adhesive from the nozzle of a coating apparatus, and also may result in sagging of the adhesive after coating when coated on members or the like with an edge surface. The poor workability of the adhesive raises such problems as adhesive composition adhering to a different part relative to the target part, or the adhesive sagging and consequently aggravating the design of the product as members to be bonded at positions adjacent to each other cannot be bonded at right positions, respectively.

The two problems to be improved as described above will now be described more specifically. A keypad for push-button switches for use in inputting operations is utilized in various articles such as cellular phones, personal digital assistance, remote controls for various household electrical appliances, card remote controls, and a variety of keyboards. The keypad for push-button switches has a structure that includes a base portion made of a rubbery elastic material such as silicone rubber, and a keytop portion made of molded hard resin such ABS resin and fixingly bonded to the base portion with an adhesive. The keytop portion is marked with a character, a numeric character or a symbol as an input element. Pressing the keytop portion makes the base portion warp in the direction of the pressing so that an electroconductive contact point positioned below the base portion is brought into electrical continuity, thus allowing a predetermined input of the marked character or the like.

In such a keypad for push-button switches, the keytop portion is thus bonded to the base portion with an adhesive and in the step of bonding it, the above-mentioned two problems still remain to be solved. That is, the keypad for push-button switches is subject to being repeatedly pressed. Accordingly, the adhesive layer must have high adhesion so that it can endure the force of the pressing operation repeatedly applied thereto. However, the above-mentioned conventional adhesives cannot provide such high adhesion and it is necessary to subject the keytop portion or base portion to the above-mentioned preliminary treatments before they can be bonded in the bonding step in order to increase the adhesion. Therefore, it has been practically difficult to simplify the bonding step.

Further, since the above-mentioned conventional adhesives have poor bonding workability, the adhesive composition may adhere to a different part relative to the target part, or sags and consequently aggravates the design of the keypad for push-button switches. On the other hand, in the case where keytop portions must be bonded at positions adjacent to each other, for example, as in the case of the keypad for push-button switches in a cellular phone, the keytop portions cannot be bonded at precise positions, respectively.

The inventors of the present invention have made extensive studies with a view toward solving the above-mentioned problems and as a result, they have found that a specified adhesive composition is useful as the above-mentioned active energy ray-curing adhesive composition and is excellent in overcoming the above-mentioned problems relating to adhesion and bonding workability, thereby achieving the present invention.

SUMMARY OF THE INVENTION

A first object of the present invention is to provide an active energy ray-curing adhesive composition that not only has a high curing rate but also is excellent in adhesion and bonding workability.

A second object of the present invention is to provide a keypad for a push-button switch in which not only the bonding speed of a keytop portion to a base portion is high but also the adhesion and bonding workability during a bonding step are excellent.

More particularly, the present invention relates to an active energy ray-curing adhesive composition containing a urethane (meth)acrylate, a (meth)acrylamide compound, and a hydroxyl group-containing (meth)acrylate.

The active energy ray-curing adhesive composition has good adhesion to plastics. The (meth)acrylamide compound containing a component having a dialkylacrylamide group, in particular, N,N-diethylacrylamide, is preferable since the adhesive force to plastics becomes higher. Further, an adhesive composition containing a particulate silicic anhydride and at least one of a tertiary amine salt or a tertiary amine in addition to the urethane (meth)acrylate, the (meth)acrylamide compound, and the hydroxyl group-containing (meth) acrylate, does not cause stringing from the nozzle of a coating apparatus, shows less sagging when it is coated, and can be coated accurately, sufficiently and easily on a bonding area.

Further, the present invention provides a keypad for a push-button switch including a base portion made of a rubbery elastic material and a keytop portion made of a hard resin and fixed to the base portion, in which the keytop portion is bonded to the base portion through an adhesive layer made of a solidified active energy ray-curing adhesive composition containing a urethane (meth)acrylate, a (meth) acrylamide compound, and a hydroxyl group-containing (meth)acrylate.

According to this keypad for the push-button switch, high adhesive strength is obtained and it is difficult for the keytop portion to be peeled away from the base portion since the base portion made of a rubbery elastic material and the keytop portion made of a hard resin are bonded together through the adhesive layer made of the solidified active energy ray-curing adhesive composition containing a urethane (meth) acrylate, a (meth) acrylamide compound, and a hydroxyl group-containing (meth)acrylate. In particular, when the (meth)acrylamide compound contains a component having a dialkylacrylamide group, particularly N,N-diethylacrylamide, the keypad is excellent in improvement of adhesion.

As components to be contained in the adhesive composition that constitutes the adhesive layer, besides the urethane (meth) acrylate, the (meth)acrylamide compound, and the hydroxyl group-containing (meth)acrylate, a particulate silicic anhydride, and at least one of a tertiary amine salt or a tertiary amine may be contained. Use of an adhesive composition that contains such components makes it possible to obtain a keypad for a push-button switch that causes neither stringing from the nozzle of a coating apparatus nor sagging after coating when the keytop portion made of a hard resin and the base portion made of a rubbery elastic material are bonded to each other, that has excellent bonding operationality and excellent bonding workability, and that can be produced easily and at a low cost.

The keypad for the push-button switch, in which the above-mentioned active energy ray-curing adhesive composition is an ultraviolet ray-curing adhesive composition, allows production in a relatively short time since the solidification of the adhesive composition can take place in a time on the order of second. In addition, stability during coating operation or during storage is high and there is no need to mix plural compositions before use, so that the workability is excellent. Therefore, the production step becomes simpler and faster and hence inexpensive keypads for push-button switches can be obtained.

Further, even if a protective layer that protects the base portion is formed between the base portion and the adhesive layer, it is difficult for the keytop portion to be peeled away from the base portion since the adhesion between the protective layer and the adhesive layer made of the above-mentioned solidified adhesive composition is excellent. In particular, in the case where the protective layer is made of a crosslinking urethane resin, the keypad has a disadvantage. That is, although the resin has not been crosslinked at the time of coating, thus giving excellent workability, and being exceedingly durable due to crosslinking, a phenomenon occurs in which the initial adhesion changes with a lapse of time, presumably since the reaction gradually proceeds also after the formation of the keypad, and thus the keypad after a considerable time is not sufficiently adhered. However, according to the present invention, a decrease in adhesion does not occur even in such a resin and the adhesive retains sufficient adhesive force even with a lapse of time. Therefore, even in the case of a composite keypad including a flexible keytop portion formed on the base portion made of a rubbery elastic material such as silicone rubber, by providing the base portion with a partially thick protrusion and a hard keytop portion made of a hard resin fixed to the base portion with an adhesive, the keytop portion made of a hard resin is firmly bonded to the base portion, so that a keypad for push-button switches that is difficult to be peeled from the base portion can be obtained.

The present invention is not limited to what has been described above and the objects, advantages, features and utilities of the present invention will become clearer by the following description with reference to the accompanying drawings. Also, it should be understood that the appropriate variations of the described invention, made without departing from the scope and spirit of the present invention be encompassed within the scope of the invention as claimed.

BRIEF DESCRIPTION OF THE DRAWINGS

In the accompanying drawings:

FIGS. 2A and 2B show a variation of a hard resin-made keytop for use in the keypad for push-button switches according to the present invention, in which FIG. 2A is a bottom view showing a variation of a hard resin-made keytop for use in the keypad for push-button switches according to the present invention, and FIG. 2B is a cross-sectional view taken along the line SA—SA in FIG. 2A;

FIG. 3A and FIG. 3B show a variation of a hard resin-made keytop for use in the keypad for push-button switches according to the present invention, in which FIG. 3A is a bottom view showing a variation of a hard resin-made keytop for use in the keypad for push-button switches according to the present invention, and FIG. 3B is a cross-sectional view taken along the line SB—SB in FIG. 3A; and FIG. 4A and FIG. 4B show a variation of a hard resin-made keytop for use in the keypad for push-button switches according to the present invention, in which FIG. 4A is a bottom view showing a variation of a hard resin-made keytop for use in the keypad for push-button switches according to the present invention, and FIG. 4B is a cross-sectional view taken along the line SC—SC in FIG. 4A.

DESCRIPTION OF THE PREFERRED EMBODIMENTS

Figure 1:
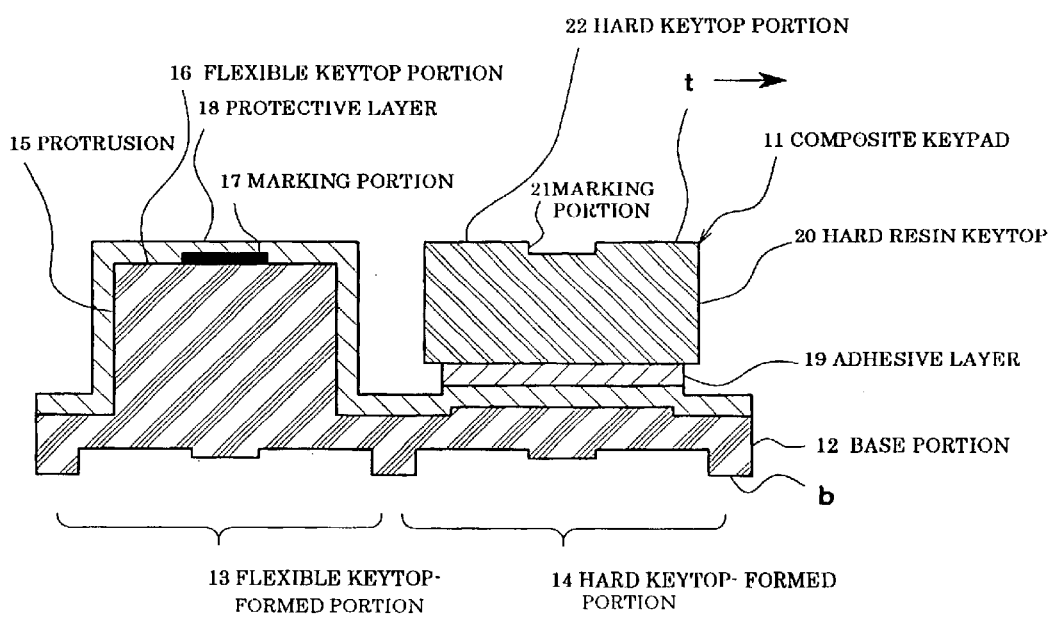
FIG. 1 is a schematic longitudinal cross-sectional view showing a keypad for push-button switches according to the present invention.

Hereinafter, the present invention will be described in detail by embodiments.
Embodiments of Adhesive Composition In one embodiment, an active energy ray-curing adhesive composition of the present invention includes a urethane (meth)acrylate (Component (1)), a (meth)acrylamide compound (Component (2)), and a hydroxyl group-containing (meth)acrylate (Component (3)). In another embodiment, the active energy ray-curing adhesive composition of the present invention includes a urethane (meth)acrylate (Component (1)), a (meth)acrylamide compound (Component (2)), a hydroxyl group-containing (meth) acrylate (Component (3)), a particulate silicic anhydride (Component (4)), and at least one of a tertiary amine salt or a tertiary amine (Component (5)). Hereinafter, these components will be described in detail.

The urethane (meth)acrylate, Component (1), is obtained by reacting a polyisocyanate, a polyol and a hydroxyl group-containing (meth)acrylate. That is, the urethane (meth)acrylate can be obtained as follows. First, the polyisocyanate and polyol are reacted to produce a high-molecular polyisocyanate, which is then reacted with the hydroxyl group-containing (meth) acrylate to have unsaturated groups bonded to terminals thereof. Alternatively, first, the hydroxyl group-containing (meth)acrylate and the polyisocyanate are reacted and the obtained unsaturated polyisocyanate is reacted with the polyol; optionally, the obtained unsaturated polyisocyanate is reacted with the polyol in the co-presence of the polyisocyanate.

It is preferred that the above-mentioned components have a number average molecular weight of 400 to 40,000.

The polyisocyanate used herein includes, for example, tolylene diisocyanate, 1,6-hexane diisocyanate, 4,4'-diphenylmethane diisocyanate, polymethylene polyphenyl isocyanate, 1,6-hexane diisocyanate trimer, hydrogenated tolylene diisocyanate, hydrogenated 4,4'-diphenylmethane diisocyanate, xylylene diisocyanate, hydrogenated xylylene diisocyanate, m-phenylene diisocyanate, p-phenylene diisocyanate, tolylene diisocyanate dimer, 1,5-naphthalene diisocyanate, trimethylhexamethylene diisocyanate, hexamethylene diisocyanate co-adducts, 4,4'-dicyclohexylmethane diisocyanate, trimethylolpropane tris (tolylene diisocyanate) adducts, and isophorone diisocyanate. Of those, isophorone diisocyanate is preferable, because the adhesive layer thereof hardly undergoes color change to yellow over time.

The hydroxyl group-containing (meth)acrylate includes: for example, hydroxyalkyl (meth)acrylates such as 2-hydroxyethyl (meth)acrylate, 2-hydroxypropyl (meth)acrylate, hydroxybutyl (meth)acrylate, hydroxypentyl (meth)acrylate, hydroxyhexyl (meth)acrylate, hydroxyoctyl (meth)acrylate, pentaerythritol tri(meth)acrylate, pentaerythritol di(meth)acrylate, pentaerythritol mono(meth)acrylate, trimethylolpropane di(meth)acrylate; and trimethylolpropane mono(meth)acrylate; 1,4-butanediol tri(meth)acrylate; and caprolactone-modified 2-hydroxyethyl (meth)acrylate. Of those, 2-hydroxyethyl acrylate is preferable, because it has high reactivity in acrylic double bonds to provide rapid curing rate and high curing strength.

Polyol includes, for example, a low molecular weight polyol, polyether polyol, polycarbonate polyol, and polyester polyol. The low molecular weight polyol includes, for example, ethylene glycol, propylene glycol, cyclohexane dimethanol, and 3-methyl-1,5-pentanedio. The polyether polyol includes, for example, polyalkylene glycol such as polyethylene glycol, polypropylene glycols, and polytetramethylene glycol; and diols of a block or random polymer etc. such as polyethylene polypropoxy block polymer diol. The polycarbonate polyol includes, a reaction product or the like of the above-mentioned low molecular weight polyol, the above-mentioned polyether polyol or/and bisphenol such as bisphenol A with a dialkyl carbonate ester such as ethylene carbonate and dibutyl carbonate ester. The polyester polyol includes, an esterification product of the above-mentioned low molecular weight polyol or/and the above-mentioned polyether polyol with an acid component such as a dibasic acid such as adipic acid, succinic acid, phthalic acid, tetrahydrophthalic acid, hexahydrophthalic acid, and terephthalic acid or an anhydride thereof. Of those, polyether polyol is preferred from the viewpoint of good storage stability The amount of the urethane (meth) acrylate used is preferably 10 to 70 parts by mass, more preferably 15 to 60 parts by mass per 100 parts by mass of the sum of the urethane (meth) acrylate, Component (1), the (meth) acrylamide compound, Component (2), and the hydroxyl group-containing (meth) acrylate, Component (3). If this amount is less than 10 parts by mass, there is the fear that the curability of the adhesive composition is aggravated while if it is above 70 parts by mass, there is the fear that the viscosity is too high so that the bonding workability is aggravated.

The (meth) acrylamide compound as the Component (2) includes, acrylamide, N,N-dimethyl (meth)acrylamide, N,N-diethyl (meth)acrylamide, N-methylol (meth) acrylamide, N,N-diacetone (meth) acrylamide, N-isopropyl acrylamide, and diacetone acrylamide. One, two or more of the above-mentioned compounds may be used.

Of those, components containing a dialkylacrylamide group are preferred, with N,N-diethylacrylamide being more preferred, in consideration of the large effect of improving adhesion to plastics which is attributable to these compounds, in particular, the large effect of improving adhesion between the keytop portion made of a hard resin and the protective layer when used for a keypad for push-button switches.

The amount of the (meth) acrylamide compound used is preferably 5 to 55 parts by mass, more preferably 10 to 50 parts by mass per 100-part by mass of the sum of the urethane (meth) acrylate, Component (1), the (meth) acrylamide compound, Component (2), and the hydroxyl group-containing (meth)acrylate, Component (3). If this amount is less than 5 parts by mass, there is a fear that the adhesive strength to an adherend is decreased while if it is above 55 parts by mass, there is the fear that the bonding workability is aggravated.

The hydroxyl group-containing (meth) acrylate as the Component (3) includes, hydroxyalkyl (meth)acrylates such as 2-hydroxyethyl (meth)acrylate, 2-hydroxypropyl (meth) acrylate, hydroxybutyl (meth)acrylate, hydroxypentyl (meth)acrylate, hydroxyhexyl (meth)acrylate, hydroxyoctyl (meth)acrylate, pentaerythritol tri(meth)acrylate, pentaerythritol di(meth)acrylate, pentaerythritol mono(meth) acrylate, and trimethylolpropane di or mono (meth) acrylate; and phenoxyhydroxypropyl (meth) acrylate. One, two or more of the above-mentioned compounds may be used.

Of those, 2-hydroxyethyl methacrylate is preferred in view of good adhesion to plastics as an adherend, particularly when used for a keypad for push-button switches, the good adhesion to the keytop portion and the protective layer, and good bonding workability.

The amount of the hydroxyl group-containing (meth) acrylate used is preferably 5 to 55 parts by mass, more preferably 10 to 50 parts by mass per 100-part by mass of the sum of the urethane (meth)acrylate, Component (1), the (meth)acrylamide compound, Component (2), and the hydroxyl group-containing (meth)acrylate, Component (3). If this amount is less than 5 parts by mass, there is a fear that the effect of improving the adhesion to plastics serving as an adherent is decreased. Particularly when the adhesive composition is used for a keypad for push-button switches, it is possible that no adhesion is obtained between the keytop portion and the protective layer, and workability is very poor. If this amount is above 55 parts by mass, there is the fear that the curability of the adhesive composition is aggravated.

As the particulate silicic anhydride, Component (4), anhydrous silicon dioxide in the form of particulates may suffice and surface-untreated particulate silicon dioxide having a specific surface area of 50 to 380 $m^2/g$ and a particle diameter of 7 to 40 nm can be given as a preferable example, which is obtained by a high temperature hydrolysis method (dry method).

The amount of the particulate silicic anhydride used is preferably 1 to 15 parts by mass, more preferably 2 to 10 parts by mass, per 100-part by mass of the sum of the urethane (meth) acrylate, Component (1), the (meth) acrylamide compound, Component (2), and the hydroxyl group-containing (meth)acrylate, Component (3). If this amount is less than 1 part by mass, there is the fear that sagging occurs considerably so that the effect of improving the bonding workability cannot be obtained; in particular, when the adhesive composition is used for a keypad for push-button switches, the adhesive may flow out onto the base portion where bonding is unnecessary. On the other hand, if it is above 15 parts by mass, there is the fear that the viscosity is too high so that the bonding workability is considerably aggravated.

The tertiary amine salts as Component (5) include, for example, 1,8-diazabicyclo[5,4,0]undecene-7-phenol salt, 1,8-diazabicyclo[5,4,0]undecene-7-octylate, 1,8-diazabicyclo[5,4,0]undecene-7-oleate, 1,8-diazabicyclo[5,4,0]undecene-7-p-toluenesulfonate, and 1,8-diazabicyclo[5,4,0]undecene-7-formate. Additionally, the tertiary amines, Component (5), include, for example, 1,8-diazabicyclo[5,4,0]undecene-7,1,4-diazobicyclo[2,2,2]octane and the like. One, two or more of the above-mentioned tertiary amines or salts thereof may be used.

Of those, 1,8-diazabicyclo[5.4.0]undecene-7-phenol salt is preferable for the tertiary amine salt and 1,8-diazabicyclo[5.4.0]undecene-7 and 1,4-diazobicyclo[2.2.2]octane are preferable for the tertiary amine in consideration of the large effect of improving bonding workability, such as sagging property and stringing property attributable to such compounds.

The amount of the tertiary amine salt or of the tertiary amine used is preferably 0.05 to 2.0 parts by mass, more preferably 0.1 to 1.5 parts by mass, per 100-part by mass of the sum of the urethane (meth)acrylate, Component (1), the (meth)acrylamide compound, Component (2), and the hydroxyl group-containing (meth)acrylate, Component (3). If this amount is less than 0.05 part by mass, there is the fear that stringing occurs so that good bonding workability is not obtained; in particular when the adhesive composition is used for a keypad for push-button switches, a cured product of the adhesive composition produced by the stringing may remain between the keytop portions adjacent to each other. On the other hand, if it is above 2.0 parts by mass, there is the fear that the viscosity is too high so that the bonding workability is considerably aggravated.

A photopolymerization initiator to be used for curing the adhesive composition by ultraviolet ray includes: for example, benzoin and alkylethers thereof such as benzoin, benzoin methyl ether, benzoin ethyl ether, and benzoin isopropyl ether; acetophenones such as acetophenone, 2,2-dimethoxy-2-phenylacetophenone, 2,2-diethoxy-2-phenylacetophenone, 1,1-dichloroacetophenone, 1-hydroxyacetophenone, 1-hydroxycyclohexyl-phenylketone, and 2-methyl-1-[4-(methylthio)phenyl]-2-morpholino-propan-1-one; anthraquinones such as 2-methylanthraquinone, 2-ethylanthraquinone, 2-tert-butylanthraquinone, 1-chloroanthraquinone, and 2-amylanthraquinone; thioxanthones such as 2,4-dimethylthioxanthone, 2,4-diethylthioxanthone, 2-chlorothioxanthone, and 2,4-diisopropylthioxanthone; ketals such as acetophenone dimethyl ketal, and benzyl dimethyl ketal (2,2-dimethoxy-1,2-diphenylethan-1-one); monoacylphosphine oxide such as 2,4,6-trimethylbenzoyldiphenylphosphine oxide, or bisacylphosphine oxide; benzophenones such as benzophenone; and xanthones. One, two or more of the above-mentioned photopolymerization initiators may be used.

The amount of the photopolymerization initiator used is preferably 0.1 to 10 parts by mass, more preferably 1 to 8 parts by mass, per 100-part by mass of the sum of the urethane (meth)acrylate, Component (1), the (meth)acrylamide compound, Component (2), and the hydroxyl group-containing (meth)acrylate, Component (3).

If necessary, compounds containing one or more polymerizable functional group(s) having ethylenically unsaturated bond(s), other than the urethane (meth)acrylate as the composition (1) and the hydroxyl group-containing (meth)acrylate as the composition (3) may be used. Such a compound includes monofunctional and polyfunctional compounds containing ethylenically unsaturated group(s). The ethylenically unsaturated group is preferably an acrylic group or a vinyl group. Examples are referred to hereinafter. The monofunctional compound includes, for example, butanediol mono(meth)acrylate, cyclohexyl (meth)acrylate, dicyclopentanyl (meth)acrylate, dicyclopentenyl (meth)acrylate, N,N-diethylaminoethyl (meth)acrylate, 2-ethoxyethyl (meth)acrylate, isobornyl (meth)acrylate, lauryl (meth)acrylate, acryloylmorpholine, N-vinylcaprolactam, nonylphenoxypolyethylene glycol (meth)acrylate, nonylphenoxypolypropylene glycol (meth)acrylate, phenoxyethyl (meth)acrylate, phenoxydiethylene glycol (meth)acrylate, polyethylene glycol (meth)acrylate, polypropylene glycol (meth)acrylate, and tetrahydrofurfuryl (meth)acrylate. The polyfunctional compound includes, for example, 1,4-butanediol (meth)acrylate, dicyclopentanyl di(meth)acrylate, ethylene glycol di(meth)acrylate, dipentaerythritol hexa(meth)acrylate, caprolactone-modified dipentaerythritol hexa(meth)acrylate, 1,6-hexanediol di(meth)acrylate, neopentyl glycol di(meth)acrylate, pentaerythritol tri(meth)acrylate, polyethylene glycol (meth)acrylate, polypropylene glycol (meth)acrylate, tetraethylene glycol di(meth)acrylate, trimethylolpropane tri(meth)acrylate, tris(acryloxyethyl)isocyanurate, and tricyclodecanedimethanol di(meth)acrylate. One, two or more of the above-mentioned compounds containing one or more polymerizable functional groups having ethylenically unsaturated bond(s) may be used.

Also, to the adhesive composition may be compounded silane coupling agents, acidic phosphoric acid compounds, antioxidants, colorants, releasing agents, polymerization inhibitors, ultraviolet absorbents, light stabilizers, fillers, leveling agents, lubricants, plasticizers and so on, as needed. The acidic phosphoric acid compounds include acidic phosphoric acid compounds represented by the following general formula (1).

General formula (1)

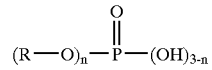

wherein R represents a $CH_2=CR_1CO(OR_2)_m-$ group (provided that $R_1$ represents a hydrogen or methyl group; $R_2$ represents $-C_2H_4-$, $-C_3H_6-$, $-CH_2CH(CH_3)-$, $-C_4H_8-$, $-C_6H_{12}-$, or

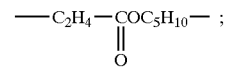

and m represents an integer of 1 to 10), and n represents an integer of 1 or 2.

The adhesive composition can be produced by stirring or mixing the components. The obtained adhesive composition can be used by coating it to a base material and irradiating it with an active energy ray.

Examples of the active energy ray that cures the adhesive composition include ultraviolet rays, X-rays and electron beams. It is preferred that ultraviolet rays be used since an inexpensive apparatus can be used therefor. The light source that can be used when curing is performed by means of ultraviolet rays includes various ones. For example, pressurized or high pressure mercury lamps, metal halide lamps, xenon lamps, electrodeless discharge lamps, carbon arc lamp and the like may be mentioned as examples.

The material that exhibits desirable adhesion as an adherend to which the adhesive composition of the present invention is applied is a plastic. In this case, the form of the adherend may be a film, a sheet, a tape, a cloth or other forms. The plastic adherend may be reinforced with glass fibers, metal fibers, carbon fibers or the like or may be a composite combined with other materials. Examples of the plastic include polyurethane resins, polycarbonate resins, acrylic resins, ABS resins, and vinyl chloride resins. The adhesive composition of the present invention has particularly strong adhesive force to these plastics. Therefore, the above-mentioned plastics are preferable as an adherend.

Embodiments of Keypad for Push-Button Switches

The keypad for push-button switches of the present invention is a keypad for push-button switches that includes a base portion made of a rubbery elastic material and a keytop portion made of a hard resin which is fixed to the base portion. As one embodiment of the keypad for push-button switches, a so-called composite keypad will be described hereinbelow. The composite keypad for push-button switches includes a flexible keytop portion constituted by a protrusion formed on a base portion made of a rubbery elastic material and a hard keytop portion constituted by a hard resin keytop. In other words, the composite keypad includes a base portion made of a rubbery elastic material having thereon a flexible keytop portion and a hard keytop portion.

As shown in FIG. 1, a composite keypad 11 includes a base portion 12 made of a rubbery elastic material. The base portion 12 is provided with a flexible keytop-formed portion 13 and a hard keytop-formed portion 14. Of these, the flexible keytop portion 13 is provided with a flexible keytop portion 16 by forming a thick protrusion 15 on the base portion 12 intended to give a soft operation touch to the operator when the operator performs pressing operation. On the surface of the flexible keytop portion 16, a marking portion 17 that marks a character, a numeric character, a symbol or the like is formed by printing. Reference numeral 18 stands for a protective layer, which is formed by coating so as to cover the upper surface of the base portion 12 including the protrusion 15 and functions so as to suppress the wear of the marking portion 17 on the flexible keytop portion 16 or the wear or breakage of the base portion 12. On the other hand, to the hard keytop-formed portion 14 is bonded a hard resin keytop 20 made of a hard resin on the protective layer 18 of the base portion 12 through an adhesive layer 19. A schematic structure of the composite keypad 11 according to this embodiment as shown in FIG. 1 is as described above. Note that each of the flexible keytop-formed portion 13 and the hard keytop-formed portion 14 of the composite keypad 11 may be formed in plural numbers. Next, material and the like of each portion will be described in detail.

The base portion 12 is made of a rubbery elastic material that elastically supports the flexible keytop portion 16 and the hard keytop portion 22 so that they can move in the direction of the pressing operation in accordance with key operation preformed by the operator. For example, the base portion 12 is made of a silicone rubber or a thermoplastic elastomer. Of those, a silicone rubber is preferably used since it has, in particular, excellent cold resistance, heat resistance, weather resistance, precision moldability and electrical insulating properties.

The protective layer 18 that covers the base portion 12 is required to have good adhesion with the rubbery elastic material and excellent wear resistance in order to prevent the marking portion 17 and the flexible keytop portion 16 from, for example, being abraded or fractured by repeated operation of the keypad. The protective layer 18 is formed, for example, by coating a coating agent made of a urethane, epoxy, polyester, amino, acrylic or the like resin and curing it. Of these resin coating agents, a coating agent made of a crosslinking urethane resin having urethane crosslinking that has excellent wear resistance and high adhesion is preferable. The hue, transparency and the like of the protective layer 18 may be selected as appropriate depending on the design of the keypad. Further, the thickness of the protective layer 18 is preferably in the range of 5 μm to 100 μm. If the thickness of the film is less than 5 μm, the mechanical strength of the protective layer is weak so that it cannot sufficiently protect the surface of the base portion 12. On the other hand, if the thickness of the film is above 100 μm, the flexible keytop portion 16 and the hard resin keytop portion 20 give a heavy pressing operation feeling and thus it is undesirable.

For the method of coating the coating agent that forms the protective layer 18, a dispenser coating method, a potting coating method, a pad printing method, a screen printing method and a transfer coating method as well as a spray coating method may be used.

To further improve the adhesion to the base portion 12 that serves as an adherend for the protective layer 18, at least one method selected from among an irradiation treatment with a short wavelength ultraviolet ray, a corona discharge processing, a flame treatment, a plasma treatment, and a primer treatment may be used to perform surface modification of the base portion 12. This allows firm bonding of the protective layer 18.

Here, an irradiation treatment with a short wavelength ultraviolet ray means surface modification by irradiating an ultraviolet ray having a short wavelength onto the surface of the base portion 12 at a predetermined illuminance and in a predetermined integrated quantity of light. More specifically, dual radiation having wavelengths of 184.9 nm and 253.7 nm from a mercury lamp in which mercury has been filled at a pressure on the order of $10^{-1}$ mmHg generates ozone in the presence of oxygen and the ozone thus generated oxidizes the surface of a non-treated body to generate active groups such as carboxyl groups and silanol groups, which improve adhesion and affinity of printing inks, coating compositions or the like.

A corona discharge treatment is a treatment in which high voltage is applied between electrodes in the air to cause dielectric breakdown and discharge, through which a body to be treated is passed to thereby oxidize a polymer on the surface layer and introduce active groups to the surface so that adhesion and affinity of printing inks and coating compositions are improved.

The term "flame treatment" means a treatment in which a body to be treated is passed through a strong oxidizing flame to bring about the same effects as those by the corona discharge treatment.

The term "plasma treatment" means performing glow discharge in a low pressure inert gas, oxygen or halogen gas to ionize the molecules of the gas to generate plasma and utilizing the chemical activity thereof to activate the surface of a target.

Since the short-wavelength ultraviolet irradiation treatment, corona discharge treatment, flame treatment or plasma treatment is a dry process, its step can be simplified as compared with the method in which a coupling agent is used. However, the plasma treatment is relatively complex as it must be performed under vacuum, and the flame treatment can be somewhat dangerous, so consequently the short-wavelength ultraviolet irradiation treatment and the corona discharge treatment are the most desirable methods.

In this embodiment, the composite keypad 11 is provided with the protective layer 18 so as to cover the entire surface of the base portion 12 regardless of whether it is for the flexible keytop-formed portion 13 or the hard keytop-formed portion 14 for the sake of convenience of the production process. Therefore, the adhesive layer 19 that fixes the hard resin keytop 20 is formed by lamination on the protective layer 18.

The hard resin keytop 20, which is bonded to the protective layer 18 through the adhesive layer 19, is fabricated by die molding or by machining. The composition, modulus of elasticity, hue and the like of the hard resin keytop 20 may be selected as appropriate depending on the design, utility or the like of the composite keypad 11. For example, thermoplastic resins such as polycarbonate resins, acrylic resins, and ABS resins may be used as the material of the hard resin keytop 20. The hard resin keytop 20 may be made translucent or transparent in the case where the hard resin keytop 20 is illuminated, where a marking portion is formed on the back side of the hard resin keytop 20 by printing or the like so that the marking portion can be seen from the outside, or where a marking portion 21 in the form of a punched character is provided on the top surface of the hard resin keytop 20 and is illuminated by an inner light source (not shown) provided on the lower side of the hard resin keytop 20.

Figure 2A:
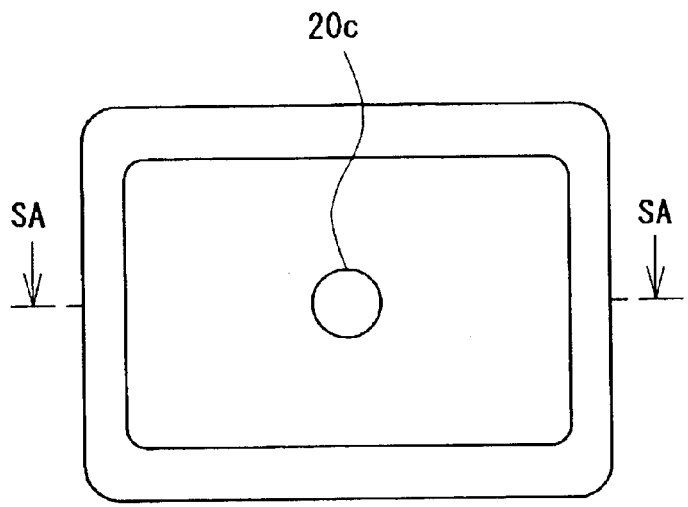
Figure 2B:
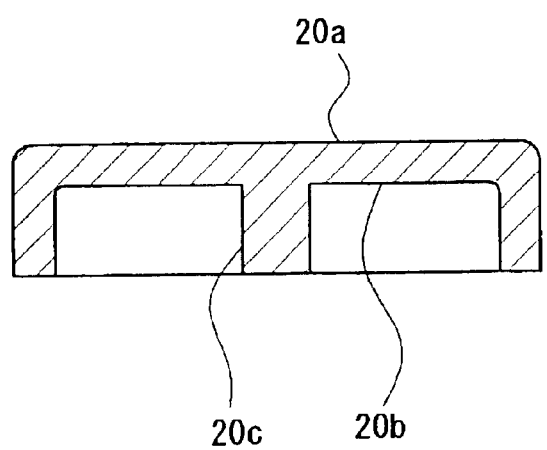
Figure 3A:
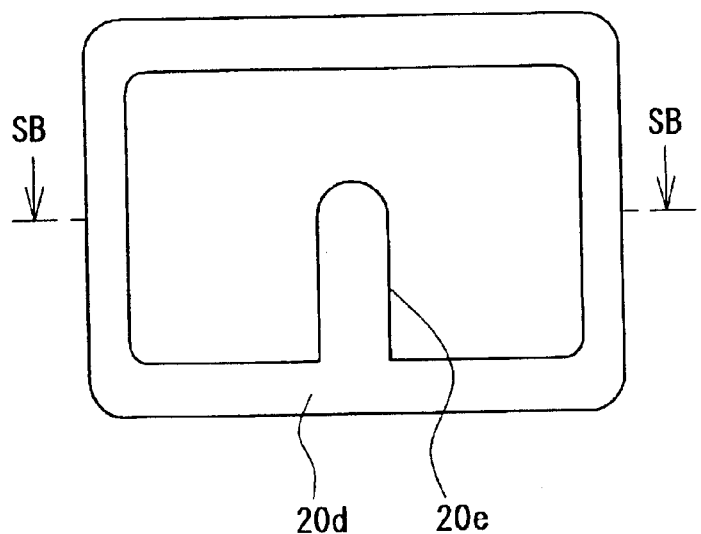
Figure 3B:
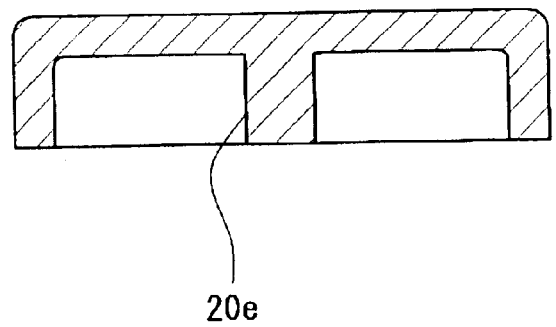
Figure 4A:
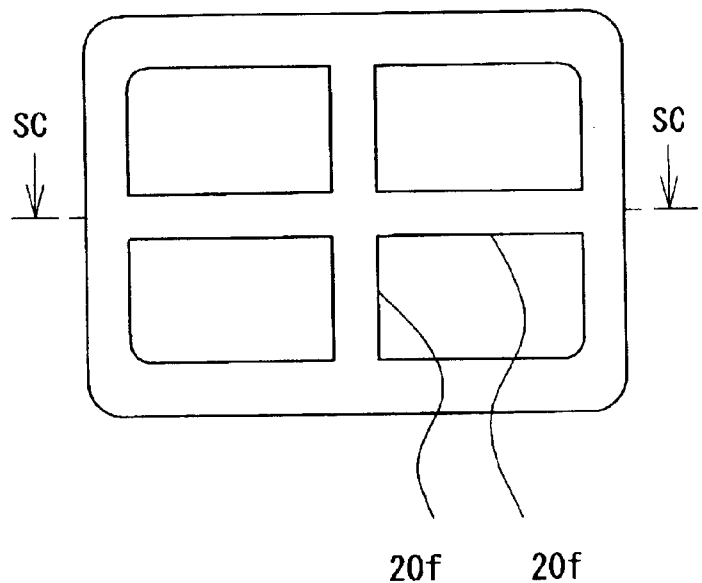
Figure 4B:
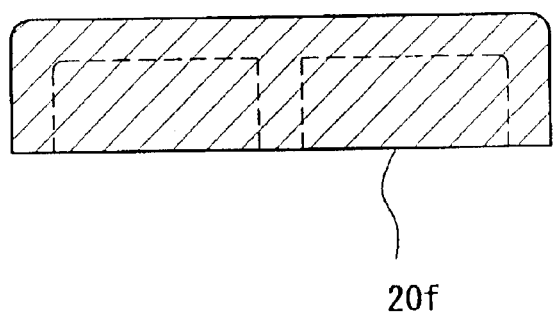

The configuration of the inside of the hard resin keytop 20 does not have to be always solid. The hard resin keytop 20 may be of a configuration such that it is partly removed or excavated in order to reduce the weight or guide light from the inner light source. The excavated configuration may include a cavity provided in the inside of the hard resin keytop 20 and in addition thereto, for example, those configurations shown in FIGS. 2A to 4B. The hard resin keytop as shown in FIGS. 2A and 2B has a configuration in which it has a columnar portion 20c in the form of a column or a prism formed on a back surface 20b opposite to a top surface 20a of the keytop with the portion other than this being excavated. The columnar portion 20c functions as a pusher that transmits the force of pressing operation applied to the hard resin keytop to the base portion 12. On the other hand, the hard resin keytop shown in FIGS. 3A and 3B, has a configuration in which the columnar portion 20c that functions as a pusher is formed so as to be connected to a peripheral wall portion 20d with the portion other than this being excavated. Further, the hard resin keytop as shown in FIGS. 4A and 4B has a configuration in which a reinforcing wall 20f is provided so as to partition the inside space in a cruciform with the portion other than this being excavated.

According to this embodiment, the marking portion 21 of the hard resin keytop 20 is formed by cutting out the surface of the hard resin keytop 20 in the form of a character, numeric character or symbol. Note that the hard resin keytop 20 may be made transparent or translucent and a marking portion may be formed on the surface side or back side of the hard resin keytop 20 by printing or the like.

The adhesive layer 19 bonds the hard resin keytop 20 to the protective layer 18. The adhesive layer 19 is formed by coating and solidifying an adhesive composition containing a urethane (meth)acrylate (Component (1)), a (meth) acrylamide compound (Component (2)), and a hydroxyl group-containing (meth)acrylate (Component (3)) and preferably further containing a particulate silicic anhydride (Component (4)), and at least one of a tertiary amine salt and a tertiary amine (Component (5)). As such an adhesive composition, the above-mentioned active energy ray-curing adhesive composition may be used.

To coat the adhesive composition that constitutes the adhesive layer 19, besides a screen printing method, various methods such as a dispenser method, a potting method, a pad printing method, a spraying method and a transfer method may be used.

The adhesive composition is coated on an adherend and then cured by irradiation of an active energy ray. In this case, photo-curing is preferable. This is because use of photo-curing can further reduce the production time since it allows solidification in a time on the order of a second; in addition, photo-curing has high stability during a coating operation or during storage; and it is unnecessary to mix plural compositions before use. Among photoreactions, ultraviolet ray curing is more preferable since visible light curing has a disadvantage in that even light from an ordinary working lamp initiates the reaction but ultraviolet curing provides good workability. Note that in the case where light is illuminated from the back side of the composite keypad 11 in FIG. 1, the base portion 12 and the protective layer 18 must be made of a light transmitting material that allows light having a wavelength of 200 to 600 nm to pass therethrough, by which the adhesive composition is cured. On the other hand, in the case where light is illuminated from the surface side of the composite keypad 11 in FIG. 1, the hard resin keytop 20 must be made of a light transmitting material that allows light having a wavelength of 200 to 600 nm to pass therethrough, by which the adhesive composition is cured.

In the case where stronger adhesion of the adhesive layer 19 is needed, the surface of the hard resin keytop 20 on which the adhesive layer 19 is bonded may be surface-modified by various methods such as a short-wavelength ultraviolet ray irradiation treatment, a corona discharge treatment, a flame treatment, a plasma treatment, or a primer treatment.

Note that the positioning when the hard resin keytop 20 and the base portion 12 are bonded to each other may be performed by providing an uneven portion for positioning in either one or both of the base portion 12 and the hard resin keytop 20. Alternatively, the positioning may be performed by use of a jig that holds the base portion 12 and the hard resin keytop 20 from the outside.

Further, another embodiment of the keypad for push-button switches will be described hereinbelow.

Another Embodiment of Keypad for Push-Button Switches

In the above-mentioned embodiment, the composite keypad 11 that includes the flexible keytop-formed portion 13 and the hard keytop-formed portion 14 has been exemplified. Unlike this composite keypad 11, the keypad for push-button switches according to another embodiment may be a hard resin keytop-provided keypad (not shown) of the type in which only a separately formed hard resin keytop is connected to a base portion made of a rubber elastic material.

Note that the method of forming the marking portion and arrangement thereof and the material of the base portion are not particularly limited to those described for the above-mentioned embodiment and a keypad for push-button switches may be formed by changing them as appropriate.

EXAMPLE

Hereinafter, the present invention will be described in more detail by presenting Examples and Comparative Examples. However, the present invention should not be considered as being limited to the Examples described below.

Examples of Adhesive Composition

1. Preparation of Adhesive Composition

Components of adhesive compositions, i.e., an urethane (meth)acrylate (Component (1)), a (meth)acrylamide compound (Component (2)), a hydroxyl group-containing (meth)acrylate (Component (3)), a particulate silicic anhydride (Component (4)), and at least one of a tertiary amine salt and a tertiary amine (Component (5)) as well as a photopolymerization initiator were mixed in ratios shown in Tables 1 to 4 and stirred to prepare adhesive compositions of the present invention. On the other hand, as Comparative Examples, adhesive compositions lacking any one of the components (1) to (5) were prepared. For the substances as raw materials, commercially available ones were used. In Tables 1 to 4, the urethane (meth)acrylate, Component (1), used was EBECRYL KRM7776 (trade name) manufactured by Daicel UCB Co., Ltd., the (meth)acrylamide compound, Component (2), used was N,N-diethylacrylamide except that N-isopropylacrylamide was used in Experiment No. 2-7-A and diacetoneacrylamide was used in Experiment No. 2-8-A, the hydroxyl group-containing (meth) acrylate, Component (3), used was 2-hydroxyethyl methacrylate, the particulate silicic anhydride, Component (4), used was AEROSIL 380 (trade name) manufactured by Nippon Aerosil Co., Ltd., the tertiary amine salt or tertiary amine, Component (5), used was 1,8-diazabicyclo[5.4.0]undecene-7-phenol salt except that 1,8-diazabicyclo[5.4.0]undecene-7 was used in Experiment No. 4-6-A and 1,4-diazobicyclo [2.2.2]octane was used in Experiment No. 4-7-A, and the photopolymerization initiator used was 2,2-dimethoxy-1,2-diphenylethan-1-one.

2. Evaluation of Adhesive Compositions

The adhesive compositions were measured and evaluated for viscosity, sagging property, stringing property, tensile shear adhesive strength, and adherence as follows. The results obtained are shown-in Tables 1 to 4.

Viscosity

In accordance with JIS K-6833 (old version K-6838), a sample was adjusted to a liquid temperature of 25° C. This was measured by using a B type viscometer and the scale of the pointer after rotating at a rotor rotation number of 20 rpm for 2 minutes was read out. From this, the viscosity (unit: mPa·s) of the sample was calculated.

Sagging Property

In an environment of a temperature of 23° C. and a relative humidity of 50%, about 0.1 g of each adhesive composition was coated on a glass plate (type: MICRO SLIDE GLASS, Preklin water-edge-ground, size: 76 mm×26 mm×0.9–1.2 mm (thickness), manufactured by Matsunami Glass Ind., Ltd.) and left to stand for 10 seconds. Thereafter, the glass plate was set upright, and the length (unit: mm) by which the adhesive composition that was coated in the form of a spot drooped in 1 minute was measured.

Stringing property

In an environment of a temperature of 23° C. and a relative humidity of 50%, each adhesive composition was coated on a glass plate (type: MICRO SLIDE GLASS, Preklin water-edge-ground, size: 76 mm×26 mm×0.9–1.2 mm (thickness), manufactured by Matsunami Glass Ind., Ltd.) through a tip of a dropper (made of polyethylene; inner diameter of nozzle, 1.5 mm; outer diameter of nozzle, 3.0 mm) and the state of stringing of the adhesive composition from the tip of the nozzle was visually observed. A sample that showed no stringing was judged good (○), a sample that showed slight stringing was judged fair (Δ), and a sample that showed stringing was judged unacceptable (x).

Tensile Shear Adhesive Strength of Polyurethane Resin

In an environment of a temperature of 23° C. and a relative humidity of 50%, each adhesive composition was coated on one side of a test piece (100 mm×25 mm×2.0 mm (thickness), made of polyurethane resin, without surface treatment) according to JIS K-6850, on which was stuck a glass plate (25 mm×25 mm×2.0 mm (thickness)). The resultant piece was irradiated with light from a 120 W/cm concentrating electrodeless discharge lamp (manufactured by Fusion Systems Corporation; type: F-450-20) at a position of 19 cm from the base, by passing it on a belt conveyor moving at a speed of 0.68 m/minute to cure the adhesive. An iron test piece was bonded to the glass plate side of the cured sample (iron piece: 100 mm×25 mm×1.6 mm (thickness)) with a room temperature-curing two-pack acrylic adhesive, and then the resultant piece was aged in an environment of a temperature of 23° C. and a relative humidity of 50% for about 1 hour. This was used as a measuring sample for measuring tensile shear adhesive strength. In an environment of a temperature of 23° C. and a relative humidity of 50%, the tensile shear adhesive strength of each sample was measured at a tension speed of 10 mm/minute. The values of the tensile shear adhesive strength (unit: MPa) obtained are shown in the column of "PU" in Tables 1 to 4.

Polyurethane Resin Adhesion

After the measurement of the tensile shear adhesive strength of the polyurethane resin, the state of breakage of the test piece was observed. A sample that caused breakage of the polyurethane resin material or cohesion failure of the adhesive was judged to be good (○) and a sample that caused breakage of the interface between the polyurethane resin and the adhesive was judged to be unacceptable (x). The results obtained are shown in the column of "PU" in Tables 1 to 4.

Tensile Shear Strength of Polycarbonate Resin

In an environment of a temperature of 23° C. and a relative humidity of 50%, each adhesive composition was coated on one side of a test piece (100 mm×25 mm×2.0 mm (thickness), made of polycarbonate resin, without surface treatment) according to JIS K-6850, onto which was stuck another test piece (100 mm×25 mm×2.0 mm (thickness), made of polycarbonate resin, without surface treatment). The resultant piece was irradiated with light from a 120 W/cm concentrating electrodeless discharge lamp (manufactured by Fusion Systems Corporation; type: F-450-20) at a position of 19 cm from the base, by passing it on a belt conveyor moving at a speed of 0.68 m/minute to cure the adhesive, and then this was aged in an environment of a temperature of 23° C. and a relative humidity of 50% for about 1 hour. This was used as a measuring sample for measuring tensile shear adhesive strength. In an environment of a temperature of 23° C. and a relative humidity of 50%, the tensile shear adhesive strength of each sample was measured at a tension speed of 10 mm/minute. The values of the tensile shear adhesive strength (unit: MPa) obtained are shown in the column of "PC" in Tables 1 to 4.

Polycarbonate Resin Adhesion

After the measurement of the tensile shear adhesive strength of the polycarbonate resin, the state of breakage of the test piece was observed. A sample that caused breakage of the polycarbonate resin material or cohesion failure of the adhesive was judged to be good (○) and a sample that caused breakage of the interface between the polycarbonate resin and the adhesive was judged to be unacceptable (x). The results obtained are shown in the column of "PC" in Tables 1 to 4.

Tensile Shear Adhesive Strength of Acrylic Resin

In an environment of a temperature of 23° C. and a relative humidity of 50%, each adhesive composition was coated on one side of a test piece (100 mm×25 mm×2.0 mm (thickness), made of acrylic resin, without surface treatment) according to JIS K-6850, onto which was stuck another test piece (100 mm×25 mm×2.0 mm (thickness), made of acrylic resin, without surface treatment). The resultant piece was irradiated with light from a 120 W/cm concentrating electrodeless discharge lamp (manufactured by Fusion Systems Corporation; type: F-450-20) at a position of 19 cm from the base, by passing it on a belt conveyor moving at a speed of 0.68 m/minute to cure the adhesive, and then this was aged in an environment of a temperature of 23° C. and a relative humidity of 50% for about 1 hour. This was used as a measuring sample for measuring tensile shear adhesive strength. In an environment of a temperature of 23° C. and a relative humidity of 50%, the tensile shear adhesive strength of each sample was measured at a tension speed of 10 mm/minute. The values of the tensile shear adhesive strength (unit: MPa) obtained are shown in the column of "AC" in Tables 1 to 4.

Acrylic Resin Adhesion

After the measurement of the tensile shear adhesive strength of the acrylic resin, the state of breakage of the test piece was observed. A sample that caused breakage of the acrylic resin material or cohesion failure of the adhesive was judged to be good (○) and a sample that caused breakage of the interface between the acrylic resin and the adhesive was judged to be unacceptable (x). The results obtained are shown in the column of "AC" in Tables 1 to 4.

Tensile Adhesive Shear Strength of ABS Resin

In an environment of a temperature of 23° C. and a relative humidity of 50%, each adhesive composition was coated on one side of a test piece (100 mm×25 mm×2.0 mm (thickness), made of an ABS resin, without surface treatment) according to JIS K-6850, onto which was stuck a glass plate (25 mm×25 mm×2.0 mm (thickness)). The resultant piece was irradiated with light from a 120 W/cm concentrating electrodeless discharge lamp (manufactured by Fusion Systems Corporation; type F-450-20) at a position of 19 cm from the resultant, by passing it on a belt conveyor moving at a speed of 0.68 m/minute to cure the adhesive. An iron test piece was bonded to the glass plate side of the cured sample (iron piece: 100 mm×25 mm×1.6 mm (thickness)) with a room temperature-curing two-pack acrylic adhesive, and then this was aged in an environment of a temperature of 23° C. and a relative humidity of 50% for about 1 hour. This was used as a measuring sample for measuring tensile shear adhesive strength. In an environment of a temperature of 23° C. and a relative humidity of 50%, the tensile shear adhesive strength of each sample was measured at a tension speed of 10 mm/minute. The values of the tensile shear adhesive strength (unit: MPa) obtained are shown in the column of "ABS" in Tables 1 to 4.

ABS Resin Adhesion

After the measurement of the tensile shear adhesive strength of the ABS resin, the state of breakage of the test piece was observed. A sample that caused breakage of the ABS resin material or cohesion failure of the adhesive was judged to be good (○) and a sample that caused breakage of the interface between the ABS resin and the adhesive was judged to be unacceptable (x). The results obtained are shown in the column of "ABS" in Tables 1 to 4.

Tensile Shear Adhesive Strength of Vinyl Chloride Resin

In an environment of a temperature of 23° C. and a relative humidity of 50%, each adhesive composition was coated on one side of a test piece (100 mm×25 mm×2.0 mm (thickness), made of a vinyl chloride resin, without surface treatment) according to JIS K-6850, onto which was stuck a glass plate (25 mm×25 mm×2.0 mm (thickness)). The resultant piece was irradiated with light from a 120 W/cm concentrating electrodeless discharge lamp (manufactured by Fusion Systems Corporation; type: F-450-20) at a position of 19 cm from the base, by passing it on a belt conveyor moving at a speed of 0.68 m/minute to cure the adhesive. An iron text piece was bonded to the glass plate side of the cured sample (iron piece: 100 mm×25 mm×1.6 mm (thickness)) with a room temperature-curing two-pack acrylic adhesive, and then this was aged in an environment of a temperature of 23° C. and a relative humidity of 50% for about 1 hour. This was used as a measuring sample for measuring tensile shear adhesive strength. In an environment of a temperature of 23° C. and a relative humidity of 50%, the tensile shear adhesive strength of each sample was measured at a tension speed of 10 mm/minute. The values of the tensile shear adhesive strength (unit: MPa) obtained are shown in the column of "VCL" in Tables 1 to 4.

Vinyl Chloride Resin Adhesion

After the measurement of the tensile shear adhesive strength of the vinyl chloride resin, the state of breakage of the test piece was observed. A sample that caused breakage of the vinyl chloride resin material or cohesion failure of the adhesive was judged to be good (○) and a sample that caused breakage of the interface between the vinyl chloride resin and the adhesive was judged to be unacceptable (x). The results obtained are shown in the column of "VCL" in Tables 1 to 4.

TABLE 1

Addition Amount of Urethane (meth) acrylate [Component (1)]

| | Use Amount (Unit: Part by mass) | | | | | | Result of Evaluation | | | | | | | | |
| --- | --- | --- | --- | --- | --- | --- | --- | --- | --- | --- | --- | --- | --- | --- | --- |
| Exp. No. | Comp. (1) | Comp. (2) | Comp. (3) | Comp. (4) | Comp. (5) | Photopolymerization initiator | Viscosity | Sagging property (mm) | Stringing property | PU | PC | AC | ABS | VCL | Memorandum |
| 1-1-A | — | 40 | 60 | 4.6 | 0.3 | 3.8 | 1000 | 50 | ○ | 1.0 x | 2.1 x | 1.3 x | 2.7 x | 1.8 x | Comparative Example |
| 1-2-A | 10 | 51 | 39 | 4.6 | 0.3 | 3.8 | 2500 | 25 | ○ | 4.8 ○ | 8.0 ○ | 3.5 ○ | 4.3 ○ | 5.1 ○ | Present Invention |
| 1-3-A | 15 | 48.5 | 36.5 | 4.6 | 0.3 | 3.8 | 3000 | 15 | ○ | 5.6 ○ | 9.1 ○ | 3.9 ○ | 4.5 ○ | 5.3 ○ | Present Invention |
| 1-4-A | 40 | 34 | 26 | 4.6 | 0.3 | 3.8 | 6000 | 5 | ○ | 5.7 ○ | 9.5 ○ | 3.9 ○ | 4.8 ○ | 5.6 ○ | Present Invention |

TABLE 1-continued

Addition Amount of Urethane (meth) acrylate [Component (1)]

| | Use Amount (Unit: Part by mass) | | | | | Result of Evaluation | | | | | | | | |
|---|---|---|---|---|---|---|---|---|---|---|---|---|---|---|
| Exp. No. | Comp. (1) | Comp. (2) | Comp. (3) | Comp. (4) | Comp. (5) | Photopolym- erization initiator | Viscos- ity | Sagging property (mm) | Stringing property | PU | PC | AC | ABS | VCL | Memorandum |
| 1-5-A | 60 | 23 | 17 | 4.6 | 0.3 | 3.8 | 16000 | 3 | ○ | 5.6 ○ | 9.3 ○ | 3.8 ○ | 4.2 ○ | 5.6 ○ | Present Invention |
| 1-6-A | 70 | 17 | 13 | 4.6 | 0.3 | 3.8 | 20000 | 6 | ○ | 4.0 ○ | 7.8 ○ | 3.6 ○ | 4.8 ○ | 3.1 ○ | Present Invention |

TABLE 2

Addition Amount of (meth) acrylamide compound or 2-hydroxyethyl methacrylate [Component (2) or Component (3)]

| | Use Amount (Unit: Part by mass) | | | | | Photo- polymeri- zation initiator | Result of Evaluation | | | | | | | | |
|---|---|---|---|---|---|---|---|---|---|---|---|---|---|---|---|
| Exp. No. | Comp. (1) | Comp. (2) | Comp. (3) | Comp. (4) | Comp. (5) | | Viscosity | Sagging property (mm) | Stringing property | PU | PC | AC | ABS | VCL | Memorandum |
| 2-1-A | 40 | — | 60 | 4.6 | 0.3 | 3.8 | 12000 | 3 | Δ | 1.0 x | 4.0 x | 1.2 x | 0.8 x | 2.3 x | Comparative Example |
| 2-2-A | 40 | 5 | 55 | 4.6 | 0.3 | 3.8 | 11000 | 3 | ○ | 4.3 ○ | 7.5 ○ | 3.0 ○ | 3.2 ○ | 2.5 ○ | Present Invention |
| 2-3-A | 40 | 10 | 50 | 4.6 | 0.3 | 3.8 | 8000 | 5 | ○ | 5.6 ○ | 9.3 ○ | 3.5 ○ | 4.8 ○ | 5.4 ○ | Present Invention |
| 1-4-A | 40 | 34 | 26 | 4.6 | 0.3 | 3.8 | 6000 | 5 | ○ | 5.7 ○ | 9.5 ○ | 3.9 ○ | 4.8 ○ | 5.6 ○ | Present Invention |
| 2-4-A | 40 | 50 | 10 | 4.6 | 0.3 | 3.8 | 4300 | 6 | ○ | 5.4 ○ | 9.2 ○ | 3.6 ○ | 4.7 ○ | 5.5 ○ | Present Invention |
| 2-5-A | 40 | 55 | 5 | 4.6 | 0.3 | 3.8 | 3500 | 9 | ○ | 4.9 ○ | 8.5 ○ | 3.5 ○ | 3.8 ○ | 5.0 ○ | Present Invention |
| 2-6-A | 40 | 60 | — | 4.6 | 0.3 | 3.8 | 3000 | 35 | ○ | 1.1 x | 3.8 x | 2.3 x | 0.9 x | 1.7 x | Comparative Example |
| 2-7-A | 40 | 34 (*) | 26 | 4.6 | 0.3 | 3.8 | 6100 | 8 | ○ | 4.0 ○ | 8.0 ○ | 2.9 ○ | 3.6 ○ | 5.0 ○ | Present Invention |
| 2-8-A | 40 | 34 (*) | 26 | 4.6 | 0.3 | 3.8 | 5900 | 8 | ○ | 4.0 ○ | 8.0 ○ | 2.9 ○ | 3.6 ○ | 5.0 ○ | Present Invention |

(*) The (meth) acrylamide compound, Component (2), used was N,N-diethylacrylamide except that N-isopropylacrylamide was used in Experiment No. 2-7-A and diacetoneacrylamide was used in Experiment No. 2-8-A.

TABLE 3

Addition Amount of Particulate Silicic Anhydride [Component (4)]

| | Use Amount (Unit: Part by mass) | | | | | | Result of Evaluation | | | |
|---|---|---|---|---|---|---|---|---|---|---|
| Experiment No. | Component (1) | Component (2) | Component (3) | Component (4) | Component (5) | Photopolym- erization initiator | Viscos- ity | Sagging property (mm) | Stringing property | Memorandum |
| 3-1-A | 40 | 24 | 18 | — | 0.3 | 3.8 | 500 | over 70 | ○ | Present Invention |
| 3-2-A | 40 | 36 | 24 | 1 | 0.3 | 3.8 | 2000 | 35 | ○ | Present Invention |
| 3-3-A | 40 | 36 | 24 | 2 | 0.3 | 3.8 | 3000 | 17 | ○ | Present Invention |
| 1-4-A | 40 | 34 | 26 | 4.6 | 0.3 | 3.8 | 6000 | 5 | ○ | Present Invention |

TABLE 3-continued

Addition Amount of Particulate Silicic Anhydride [Component (4)]

| | Use Amount (Unit: Part by mass) | | | | | Result of Evaluation | | | | |
|---|---|---|---|---|---|---|---|---|---|---|
| Experiment No. | Component (1) | Component (2) | Component (3) | Component (4) | Component (5) | Photopolymerization initiator | Viscosity | Sagging property (mm) | Stringing property | Memorandum |
| 3-4-A | 40 | 36 | 24 | 10 | 0.3 | 3.8 | 21000 | 3 | ○ | Present Invention |
| 3-5-A | 40 | 36 | 24 | 15 | 0.3 | 3.8 | 45000 | 1 | ○ | Present Invention |

TABLE 4

Addition Amount of Tertiary Amine Salt or Tertiary Amine [Component (5)]

| | Use Amount (Unit: Part by mass) | | | | | Result of Evaluation | | | | |
|---|---|---|---|---|---|---|---|---|---|---|
| Experiment No. | Component (1) | Component (2) | Component (3) | Component (4) | Component (5) | Photopolymerization initiator | Viscosity | Sagging property (mm) | Stringing property | Memorandum |
| 4-1-A | 40 | 34 | 26 | 4.6 | — | 3.8 | 2500 | 50 | x | Present Invention |
| 4-2-A | 40 | 36 | 24 | 4.6 | 0.05 | 3.8 | 3000 | 12 | ○ | Present Invention |
| 4-3-A | 40 | 36 | 24 | 4.6 | 0.1 | 3.8 | 4000 | 10 | ○ | Present Invention |
| 1-4-A | 40 | 34 | 26 | 4.6 | 0.3 | 3.8 | 6000 | 5 | ○ | Present Invention |
| 4-4-A | 40 | 36 | 24 | 4.6 | 1.5 | 3.8 | 7500 | 4 | ○ | Present Invention |
| 4-5-A | 40 | 36 | 24 | 4.6 | 2.0 | 3.8 | 11000 | 3 | ○ | Present Invention |
| 4-6-A | 40 | 36 | 24 | 4.6 | 0.3 (*) | 3.8 | 5700 | 5 | ○ | Present Invention |
| 4-7-A | 40 | 36 | 24 | 4.6 | 0.3 (*) | 3.8 | 5600 | 6 | ○ | Present Invention |

(*) The tertiary amine salt or tertiary amine, Component (5), used was 1,8-diazabicyclo[5.4.0]undecene-7-phenol salt except that 1,8-diazabicyclo[5.4.0]undecene-7 was used in Experiment No. 4-6-A and 1,4-diazobicyclo[2.2.2]octane was used in Experiment No. 4-7-A.

As shown in Tables 1 and 2, the active energy ray-curing adhesive composition of the present invention containing a urethane (meth)acrylate, a (meth)acrylamide compound, and a hydroxyl group-containing (meth)acrylate had excellent adhesion to polyurethane resins, polycarbonate resins, acrylic resins, ABS resins and vinyl chloride resins. In particular, in the case where N,N-diethylacrylamide was used as the (meth)acrylamide compound, the adhesive composition more excellently adhered to plastics, as will be apparent from comparison among Experiment Nos. 1-4-A, 2-7-A, and 2-8-A. On the other hand, adhesives lacking anyone of the three components poorly adhered to plastics. Also, as shown in Table 4, a sagging property was aggravated when the adhesive composition contained no particulate silicic anhydride while, as shown in Table 5, it had a poor stringing property when it contained neither tertiary amine salt nor tertiary amine.

Examples of Keypad for Push-Button Switches

A composite keypad as shown in FIG. 1 was fabricated. For the base portion 12, a silicone rubber compound (trade name, SH861; manufactured by Dow Corning Toray Silicone Co., Ltd.) was used. The flexible keytop-formed portion 13 was formed by printing a character serving as the marking portion 17 on the surface of the base portion 12 with a silicone ink (trade name, PRK-3; manufactured by Dow Corning Toray Silicone Co., Ltd.). Further, a short-wavelength ultraviolet ray was irradiated on the surface of the base portion 12 to affect surface modification and then a transparent urethane paint (trade name, DAIPLACOAT SO-1501; manufactured by Dainichiseika Color & Chemicals Mfg. Co., Ltd.) was coated on the surface of the base portion 12 by use of an air gun and cured and dried to provide the protective layer 18 having a film thickness of 60 μm. Thereafter, each of the adhesive compositions containing components shown in Tables 5 to 9 was coated on the bonding area to which the hard resin keytop 20 was to be bonded by using a dispenser. Then the hard resin keytop 20 molded from a colored polycarbonate resin (trade name, PANLITE L1225L; manufactured by Teijin Chemicals, Ltd.) was stuck onto the coated adhesive composition. The adhered keytop 20 was irradiated from the back side of the base portion 12 with an ultraviolet ray having a central wavelength of 365 nm under the condition of 3,000 mJ/cm$^2$ to cure the adhesive composition. Thus, the composite keypad 11 having the adhesive layer 19 adjacent to the protective layer 18 and the hard resin keytop 20 was obtained. Experiments No. and differences in components of the adhesive composition constituting the adhesive layer 19 and so on of the composite keypad 11 produced in this manner are shown in Tables 5 to 9.

Further, a composite keypad 11 of the present invention in which the materials of the base portion 12, the hard resin keytop 20, and the protective layer 18 made of the coating agent were changed and a composite keypad of the present invention in which no protective layer was provided in the hard keytop-formed portion 14 were also fabricated. In addition, as comparative examples, keypads for push-button switches using adhesive compositions without containing any one of Components (1) to (3), two-pack urethane-based or cyanoacrylate-based adhesive compositions, and conventional ultraviolet ray-curing adhesive compositions were also fabricated instead of the adhesive composition that serves as the adhesive layer 19 of the keypad 11 for push-button switches of the present invention. The thus fabricated keypads for push-button switches are together shown in Tables 5 to 9.

TABLE 5

Addition Amount of Urethane (meth) acrylate [Component (1)]

Content of each component of adhesive composition constituting an adhesive layer or name of adhesive

| Experiment No. | Component (1) | Component (2) | Component (3) | Component (4) | Component (5) | Photo-polymerization initiator | Name |
|---|---|---|---|---|---|---|---|
| 1-1-B | 40 | — | 60 | 4.6 | 0.3 | 3.8 | — |
| 1-2-B | 10 | 51 | 39 | 4.6 | 0.3 | 3.8 | — |
| 1-3-B | 15 | 48.5 | 36.5 | 4.6 | 0.3 | 3.8 | — |
| 1-4-B | 40 | 34 | 26 | 4.6 | 0.3 | 3.8 | — |
| 1-5-B | 60 | 23 | 17 | 4.6 | 0.3 | 3.8 | — |
| 1-6-B | 70 | 17 | 13 | 4.6 | 0.3 | 3.8 | — |

| Experiment No. | Protective layer (Coating agent) | Sagging property | Stringing property | Peeling strength | Memorandum |
|---|---|---|---|---|---|
| 1-1-B | Transparent urethane-based | ○ | ○ | 0.31 | Comparative Example |
| 1-2-B | Transparent urethane-based | ○ | ○ | 1.21 | Present Invention |
| 1-3-B | Transparent urethane-based | ○ | ○ | 1.40 | Present Invention |
| 1-4-B | Transparent urethane-based | ○ | ○ | 1.42 | Present Invention |
| 1-5-B | Transparent urethane-based | ○ | ○ | 1.39 | Present Invention |
| 1-6-B | Transparent urethane-based | ○ | ○ | 1.11 | Present Invention |

TABLE 6

Addition Amount of (meth) acrylamide compound or 2-hydroxyethyl methacrylate [Component (2) or Component (3)]

Content of each component of adhesive composition constituting an adhesive layer or name of adhesive

| Experiment No. | Component (1) | Component (2) | Component (3) | Component (4) | Component (5) | Photo-polymerization initiator | Name |
|---|---|---|---|---|---|---|---|
| 2-1-B | — | 40 | 60 | 4.6 | 0.3 | 3.8 | — |
| 2-2-B | 40 | 5 | 55 | 4.6 | 0.3 | 3.8 | — |
| 2-3-B | 40 | 10 | 50 | 4.6 | 0.3 | 3.8 | — |
| 1-4-B | 40 | 34 | 26 | 4.6 | 0.3 | 3.8 | — |
| 2-4-B | 40 | 50 | 10 | 4.6 | 0.3 | 3.8 | — |
| 2-5-B | 40 | 55 | 5 | 4.6 | 0.3 | 3.8 | — |
| 2-6-B | 60 | 40 | — | 4.6 | 0.3 | 3.8 | — |
| 2-7-B | 40 | 34 (*) | 26 | 4.6 | 0.3 | 3.8 | — |
| 2-8-B | 40 | 34 (*) | 26 | 4.6 | 0.3 | 3.8 | — |

| Experiment No. | Protective layer (Coating agent) | Sagging property | Stringing property | Peeling strength | Memorandum |
|---|---|---|---|---|---|
| 2-1-B | Transparent urethane-based | ○ | Δ | 0.35 | Comparative Example |
| 2-2-B | Transparent urethane-based | ○ | ○ | 1.20 | Present Invention |
| 2-3-B | Transparent urethane-based | ○ | ○ | 1.41 | Present Invention |
| 1-4-B | Transparent urethane-based | ○ | ○ | 1.45 | Present Invention |
| 2-4-B | Transparent urethane-based | ○ | ○ | 1.43 | Present Invention |

TABLE 6-continued

Addition Amount of (meth) acrylamide compound or
2-hydroxyethyl methacrylate [Component (2) or Component (3)]

| Experiment No. | Protective layer (Coating agent) | Sagging property | Stringing property | Peeling strength | Memorandum |
|---|---|---|---|---|---|
| 2-5-B | Transparent urethane-based | o | o | 1.22 | Present Invention |
| 2-6-B | Transparent urethane-based | o | o | 0.32 | Comparative Example |
| 2-7-B | Transparent urethane-based | o | o | 1.42 | Present Invention |
| 2-8-B | Transparent urethane-based | o | o | 1.41 | Present Invention |

(*) The (meth) acrylamide compound, Component (2), used was N,N-diethylacrylamide except that N-isopropylacrylamide was used in Experiment No. 2-7-B and diacetoneacrylamide was used in Experiment No. 2-8-B.

TABLE 7

Addition Amount of Particulate Silicic Anhydride [Component (4)]

Content of each component of adhesive composition constituting an adhesive layer or name of adhesive

| Experiment No. | Component (1) | Component (2) | Component (3) | Component (4) | Component (5) | Photopolymerization initiator | Name |
|---|---|---|---|---|---|---|---|
| 3-1-B | 24 | 40 | 18 | — | 0.3 | 3.8 | — |
| 3-2-B | 40 | 36 | 24 | 1 | 0.3 | 3.8 | — |
| 3-3-B | 40 | 36 | 24 | 2 | 0.3 | 3.8 | — |
| 1-4-B | 40 | 34 | 26 | 4.6 | 0.3 | 3.8 | — |
| 3-4-B | 40 | 36 | 24 | 10 | 0.3 | 3.8 | — |
| 3-5-B | 40 | 36 | 24 | 15 | 0.3 | 3.8 | — |

Result of Evaluation

| Experiment No. | Protective layer (Coating agent) | Sagging property | Stringing property | Peeling strength | Memorandum |
|---|---|---|---|---|---|
| 3-1-B | Transparent urethane-based | Δ | o | 1.42 | Present Invention |
| 3-2-B | Transparent urethane-based | o | o | 1.39 | Present Invention |
| 3-3-B | Transparent urethane-based | o | o | 1.49 | Present Invention |
| 1-4-B | Transparent urethane-based | o | o | 1.42 | Present Invention |
| 3-4-B | Transparent urethane-based | o | o | 1.45 | Present Invention |
| 3-5-B | Transparent urethane-based | o | o | 1.40 | Present Invention |

TABLE 8

Addition Amount of Tertiary Amine Salt or Tertiary Amine [Component (5)]

Content of each component of adhesive composition constituting an adhesive layer or name of adhesive

| Experiment No. | Component (1) | Component (2) | Component (3) | Component (4) | Component (5) | Photopolymerization initiator | Name |
|---|---|---|---|---|---|---|---|
| 4-1-B | 34 | 40 | 26 | 4.6 | — | 3.8 | — |
| 4-2-B | 40 | 36 | 24 | 4.6 | 0.05 | 3.8 | — |
| 4-3-B | 40 | 36 | 24 | 4.6 | 0.1 | 3.8 | — |
| 1-4-B | 40 | 34 | 26 | 4.6 | 0.3 | 3.8 | — |
| 4-4-B | 40 | 36 | 24 | 4.6 | 1.5 | 3.8 | — |
| 4-5-B | 40 | 36 | 24 | 4.6 | 2.0 | 3.8 | — |

TABLE 8-continued

Addition Amount of Tertiary Amine Salt or Tertiary Amine [Component (5)]

| | | | | | | | |
|---|---|---|---|---|---|---|---|
| 4-6-B | 40 | 36 | 24 | 4.6 | 0.3 (*) | 3.8 | — |
| 4-7-B | 40 | 36 | 24 | 4.6 | 0.3 (*) | 3.8 | — |

Result of Evaluation

| Experiment No. | Protective layer (Coating agent) | Sagging property | Stringing property | Peeling strength | Memorandum |
|---|---|---|---|---|---|
| 4-1-B | Transparent urethane-based | ○ | x | 1.43 | Present Invention |
| 4-2-B | Transparent urethane-based | ○ | ○ | 1.38 | Present Invention |
| 4-3-B | Transparent urethane-based | ○ | ○ | 1.43 | Present Invention |
| 1-4-B | Transparent urethane-based | ○ | ○ | 1.42 | Present Invention |
| 4-4-B | Transparent urethane-based | ○ | ○ | 1.43 | Present Invention |
| 4-5-B | Transparent urethane-based | ○ | ○ | 1.50 | Present Invention |
| 4-6-B | Transparent urethane-based | ○ | ○ | 1.42 | Present Invention |
| 4-7-B | Transparent urethane-based | ○ | ○ | 1.45 | Present Invention |

(*) The tertiary amine salt or tertiary amine, Component (5), used was 1,8-diazabicyclo[5.4.0]undecene-7-phenol salt except that 1,8-diazabicyclo[5.4.0]undecene-7 was used in Experiment No. 4-6-B and 1,4-diazobicyclo[2.2.2]octane was used in Experiment No. 4-7-B.

TABLE 9

Content of each component of adhesive composition constituting an adhesive layer or name of adhesive

| Experiment No. | Component (1) | Component (2) | Component (3) | Component (4) | Component (5) | Photo-polymerization initiator | Name |
|---|---|---|---|---|---|---|---|
| 5-1-B | — | — | — | — | — | — | Two-pack urethane |
| 5-2-B | — | — | — | — | — | — | Cyanoacrylate |
| 5-3-B | — | — | — | — | — | — | Ultraviolet ray-curing |
| 5-4-B | 10 | 51 | 39 | 4.6 | 0.3 | 3.8 | — |
| 5-5-B | 10 | 51 | 39 | 4.6 | 0.3 | 3.8 | — |
| 5-6-B | 10 | 51 | 39 | 4.6 | 0.3 | 3.8 | — |
| 5-7-B | 10 | 51 | 39 | 4.6 | 0.3 | 3.8 | — |

Result of Evaluation

| Experiment No. | Protective layer (Coating agent) | Sagging property | Stringing property | Peeling strength | Memorandum |
|---|---|---|---|---|---|
| 5-1-B | Transparent urethane-based | Δ | x | 1.12 | Comparative Example |
| 5-2-B | Transparent urethane-based | Δ | ○ | 1.33 | Comparative Example |
| 5-3-B | Transparent urethane-based | ○ | Δ | 1.01 | Comparative Example |
| 5-4-B | Transparent acrylic-based | ○ | ○ | 0.97 | Present Invention |
| 5-5-B | Transparent urethane-based | ○ | ○ | 3.52 | Present Invention (*) |
| 5-6-B | Transparent urethane-based | ○ | ○ | 1.51 | Present Invention (*) |
| 5-7-B | — | ○ | ○ | 1.02 | Present Invention (*) |

(*) In Experiment No. 5-5-B, a styrene-based thermoplastic elastomer was used in place of silicone rubber constituting the base portion used in Experiment No. 1-2-B (Table 5).
In Experiment No. 5-6-B, ABS resin was used in place of the polycarbonate resin constituting the keytop used in Experiment No. 1-2-B.
In Experiment No. 5-7-B, no protective layer is provided in the hard keytop-formed portion.

In Tables 5 to 9, the components of the adhesive composition of which contents were indicated are all expressed by part by mass while the adhesive compositions of which components were not indicated were indicated by name. Further, in Tables 5 to 9, the urethane (meth)acrylate, Component (1), used was EBECRYL KRM7776 (trade name) manufactured by Daicel UCB Co., Ltd., the (meth) acrylamide compound, Component (2), used was N,N-diethylacrylamide except that N-isopropylacrylamide was used in Experiment No. 2-7-B and diacetoneacrylamide was used in Experiment No. 2-8-B, the hydroxyl group-containing (meth) acrylate, Component (3), used was 2-hydroxyethyl methacrylate, the particulate silicic anhydride, Component (4), used was AEROSIL 380 (trade name) manufactured by Nippon Aerosil Co., Ltd., the tertiary amine salt or tertiary amine, Component (5), used was 1,8-diazabicyclo[5.4.0]undecene-7-phenol salt except that 1,8-diazabicyclo[5.4.0]undecene-7 was used in Experiment No. 4-6-B and 1,4-diazobicyclo[2.2.2]octane was used in Experiment No. 4-7-B, and the photopolymerization initiator used was 2,2-dimethoxy-1,2-diphenylethan-1-one. On the other hand, as the "transparent urethane-based" serving as a coating agent, DAIPLACOAT SO-1501 (trade name) manufactured by Dainichiseika Color & Chemicals Mfg. Co., Ltd. was used. As the "transparent acrylic-based", OFLEX No. 800 (trade name) manufactured by Ohashi Chemical Industries, Ltd. was used.

Further, among the adhesive compositions shown in Table 9, the "two-pack urethane" used was two-pack urethane adhesive resin (trade name, 7550; manufactured by Lord Far East, Incorporated), the "cyanoacrylate" used was cyanoacrylate adhesive resin (tradename, Loctite 401; manufactured by Three Bond Co., Ltd.), and the "ultraviolet ray-curing" used was ultraviolet ray-curing adhesive resin (trade name, TB3033D, manufactured by Three Bond Co., Ltd.). Note that the curing conditions for these adhesive compositions were heating at 80° C. for 10 minutes for the "two-pack urethane" and pressing for 20 seconds for the "cyanoacrylate". However, the curing conditions for the "ultraviolet ray-curing" were the same as the above-mentioned curing conditions for the adhesive compositions of the present invention.

On the other hand, keypads for push-button switches were fabricated in the same manner as in Experiment No. 1-2-B except that a styrene thermoplastic elastomer was used in Experiment No. 5-5-B in place of the silicone rubber serving as the base portion 12 in Experiment No. 1-2-B (Table 5); an ABS resin was used in Experiment No. 5-6-B in place of the polycarbonate resin serving as the hard resin keytop 20 in Experiment No. 1-2-B; and the adhesive layer 19 was provided without a protective layer in the hard keytop-formed portion 14 in Experiment No. 5-7-B.

Each of the keypads fabricated in Examples and Comparative Examples was subjected to peeling tests on the hard resin keytop thereof. In addition, the sagging property and stringing property of the adhesive composition that serves as the adhesive layer were observed and evaluated.

Peeling Tests:

Peeling tests on keypads for push-button switches were performed by fixing the base portion in FIG. 1, drawing the hard resin keytop in the direction indicated by the arrow under the conditions of a temperature of 23° C., a relative humidity of 50% RH, and a tension speed of 50 mm/minute, and measuring peeling strength when the hard resin keytop in the hard keytop-formed portion was peeled off from the base portion. Note that the area of the bonding area between the adhesive layer and the hard resin keytop, and the area of the bonding area between the adhesive layer and the base portion (or protective layer) were both 0.1 cm$^2$ and the thickness of the adhesive layer was 50 μm.

Sagging Property and Stringing Property:

Evaluation by visual observation on the sagging property and stringing property of the adhesive composition serving as the adhesive layer was performed based on the following ratings. For the sagging property, a sample that underwent substantially no sagging was judged to be good (○), a sample that underwent slight sagging was judged to be fair (Δ), and a sample that underwent considerable sagging was judged to be unacceptable (x). On the other hand, for stringing property, a sample that underwent no stringing was judged to be good (○), a sample that underwent slight stringing was judged to be fair (Δ), and a sample that underwent considerable stringing was judged to be unacceptable (x).

The results of the peeling tests, and the sagging property and stringing property of the adhesive composition used as the adhesive layer are shown in Tables 5 to 9. From Tables 5 to 9, it can be seen that the keypad 11 for push-button switches of the present invention that includes the active energy ray-curing adhesive composition containing a urethane (meth)acrylate, a (meth)acrylamide compound, and a hydroxyl group-containing (meth)acrylate is the keypad 11 that has excellent adhesion with the protective layer 18 made of a transparent urethane coating agent, the adhesive layer 19 and the hard resin keytop 20 made of a polycarbonate resin (or ABS resin) with the hard resin keytop 20 that is difficult to peel away from the base portion 12. In particular, in the case where N,N-diethylacrylamide was used as the (meth)acrylamide compound, the adhesion of the hard resin keytop 20 was more excellent as will be apparent from comparison among Experiment No. 1-4-B, Experiment No. 2-7-B, and Experiment No. 2-8-B. On the other hand, lack of any one of the three components resulted in poor peeling strength of the hard resin keytop. Also, as shown in Table 7, when the adhesive composition used contained no particulate silicic anhydride, the sagging property was aggravated. On the other hand, as shown in Table 8, when the adhesive composition used contained neither tertiary amine salt nor tertiary amine, the stringing property was poor. Note that in the tables, the unit of peeling strength was MPa.

Observation of the state of the fracture surface of samples after the adhesive tests revealed that in Experiment No. 1-1-B, Experiment No. 2-1-B or Experiment No. 2-6-B, which did not contain any one of Components (1) to (3), peeling occurred at the interface between the base portion and the adhesive layer. However, in other experiments shown in Tables 5 to 9, material fracture in the base portion occurred (with the adhesion with the adhesive layer being maintained).

In the case where a cyanoacrylate adhesive was used, the change in viscosity and the like with a lapse of time was great because the adhesive had instant adhesive property, so that it had a difficulty in workability. The two-pack urethane adhesive showed slight sagging and considerable stringing, and thus had poor workability. Conventional ultraviolet ray-curing adhesives showed slight stringing and adhesion thereof was not so preferable.

INDUSTRIAL APPLICABILITY

With the active energy ray-curing adhesive composition of the present invention, adhesion with plastics is good, no stringing from the nozzle of a coating apparatus occurs, and little sagging occurs when coated, so that it can be coated on a bonding area accurately, sufficiently and easily.

The keypad for push-button switches of the present invention has high adhesive strength so that the hard resin keytop is not easily peeled off. Further, because the adhesive composition causes no stringing from the nozzle of the coating apparatus when the hard resin keytop is bonded, and has excellent adhesion operability without causing no sagging after the coating, a keypad for push-button switches having excellent productivity and workability in the production of keypads for push-button switches, that is inexpensive and that has excellent adhesion of the keytop portion can be obtained.

What is claimed is:

1. An active energy ray-curing adhesive composition comprising a urethane (meth) acrylate, a (meth) acrylamide compound, and a hydroxyl group-containing (meth)acrylate.

2. An active energy ray-curing adhesive composition according to claim 1, wherein the (meth) acrylamide compound contains a component having a dialkylacrylamide group.

3. An active energy ray-curing adhesive composition according to claim 2, wherein the component having the dialkylacrylamide group comprises N,N-diethylacrylamide.

4. An active energy ray-curing adhesive composition according to claim 1, comprising a particulate silicic anhydride, and at least one of a tertiary amine salt and a tertiary amine.

5. An active energy ray-curing adhesive composition according to claim 4, wherein the composition comprises 1 to 15 parts by mass of the particulate silicic anhydride, and 0.05 to 2.0 parts by mass of the tertiary amine salt or the tertiary amine per 100 parts by mass of the total of the urethane (meth) acrylate, (meth)acrylamide compound, and hydroxyl group-containing (meth)acrylate.

6. An active energy ray-curing adhesive composition according to claim 1, wherein the composition comprises 10 to 70 parts by mass of the urethane (meth) acrylate, 5 to 55 parts by mass of the (meth) acrylamide compound, and 5 to 55 parts by mass of the hydroxyl group-containing (meth) acrylate, per 100 parts by mass of the total of the urethane (meth)acrylate, (meth)acrylamide compound, and hydroxyl group-containing (meth)acrylate.

7. A keypad for a push-button switch comprising a base portion made of a rubbery elastic material and a keytop portion made of a hard resin and fixed to the base portion,
   wherein the keytop portion is bonded to the base portion through an adhesive layer made of a solidified active energy ray-curing adhesive composition containing a urethane (meth)acrylate, a (meth)acrylamide compound, and a hydroxyl group-containing (meth) acrylate.

8. A keypad for a push-button switch according to claim 7, wherein the (meth)acrylamide compound contains a component having a dialkylacrylamide group.

9. A keypad for a push-button switch according to claim 8, wherein the component having the dialkylacrylamide group comprises N,N-diethylacrylamide.

10. A keypad for a push-button switch according to claim 7, using the active energy ray-curing adhesive composition comprising 10 to 70 parts by mass of the urethane (meth) acrylate, 5 to 55 parts by mass of the (meth) acrylamide compound, and 5 to 55 parts by mass of the hydroxyl group-containing (meth)acrylate per 100 parts by mass of the total of the urethane (meth) acrylate, (meth) acrylamide compound, and hydroxyl group-containing (meth)acrylate.

11. A keypad for a push-button switch according to claim 7, wherein the active energy ray-curing adhesive composition comprises an ultraviolet ray-curing adhesive composition.

12. A keypad for a push-button switch according to claim 7, further comprising a protective layer for protecting the base portion, which is formed between the base portion and the adhesive layer.

13. A keypad for a push-button switch according to claim 12, wherein the protective layer is made of a crosslinking urethane resin.

14. A keypad for a push-button switch according to claim 7, wherein the keypad comprises a composite keypad including a flexible keytop portion formed on the base portion made of a rubbery elastic material by providing the base portion with a protrusion and a hard keytop portion made of a hard resin keytop.

15. A keypad for a push-button switch according to claim 7, wherein the adhesive layer is made of a solidified active energy ray-curing adhesive composition further containing a particulate silicic anhydride, and at least one of a tertiary amine salt and a tertiary amine.

16. An active energy ray-curing adhesive composition according to claim 15, wherein the composition comprises 1 to 15 parts by mass of the particulate silicic anhydride, and 0.05 to 2.0 parts by mass of the tertiary amine salt or a tertiary amine per 100 parts by mass of the total of the urethane (meth)acrylate, (meth)acrylamide compound, and hydroxyl group-containing (meth)acrylate.

17. A keypad for a push-button switch according to claim 15, wherein the active energy ray-curing adhesive composition comprises an ultraviolet ray-curing adhesive composition.

18. A keypad for a push-button switch according to claim 15, further comprising a protective layer for protecting the base portion, which is formed between the base portion and the adhesive layer.

19. A keypad for a push-button switch according to claim 18, wherein the protective layer is made of a crosslinking urethane resin.

20. A keypad for a push-button switch according to claim 15, wherein the keypad comprises a composite keypad including a flexible keytop portion formed on the base portion made of a rubbery elastic material by providing the base portion with a protrusion and a hard keytop portion made of a hard resin keytop.

* * * * *